(12) United States Patent
Capewell

(10) Patent No.: US 6,580,234 B2
(45) Date of Patent: Jun. 17, 2003

(54) MONITORING APPARATUS

(75) Inventor: Terence J Capewell, Staffordshire (GB)

(73) Assignee: Lucas Industries Limited (GB)

( * ) Notice: Subject to any disclaimer, the term of this patent is extended or adjusted under 35 U.S.C. 154(b) by 0 days.

(21) Appl. No.: 10/107,640

(22) Filed: Mar. 27, 2002

(65) Prior Publication Data

US 2002/0140385 A1 Oct. 3, 2002

(30) Foreign Application Priority Data

Mar. 29, 2001 (GB) ............................................. 0107851

(51) Int. Cl.[7] .................................................. H02K 7/14
(52) U.S. Cl. ............................... 318/3; 318/9; 318/632; 318/798; 318/805; 318/825; 318/432
(58) Field of Search ................................ 318/3, 9, 630, 318/632, 798, 805, 806, 825, 826, 432, 433

(56) References Cited

U.S. PATENT DOCUMENTS

| | | | | |
|---|---|---|---|---|
| 3,618,880 A | * | 11/1971 | Hagaman et al. | ............ 244/113 |
| 4,697,126 A | * | 9/1987 | Jarvinen et al. | ............ 318/331 |
| 4,850,458 A | * | 7/1989 | Allan et al. | ............ 188/134 |
| 5,582,390 A | * | 12/1996 | Russ | ............ 244/75 R |
| 5,655,636 A | * | 8/1997 | Lang et al. | ............ 192/7 |
| 6,032,756 A | * | 3/2000 | Nishimura et al. | ............ 180/446 |
| 6,109,415 A | * | 8/2000 | Morgan et al. | ............ 192/223.1 |

* cited by examiner

Primary Examiner—Bentsu Ro
Assistant Examiner—Rina I. Duda
(74) Attorney, Agent, or Firm—Andrus, Sceales, Starke & Sawall

(57) ABSTRACT

A monitoring apparatus for monitoring operation of a no-back device of an actuator assembly driven by a motor, the apparatus comprising sensor device operable to sense an operating parameter of the motor for determining when the motor's output drive is in a direction opposite to a selected direction of motor output drive.

13 Claims, 2 Drawing Sheets

MONITORING APPARATUS

Figure 1:
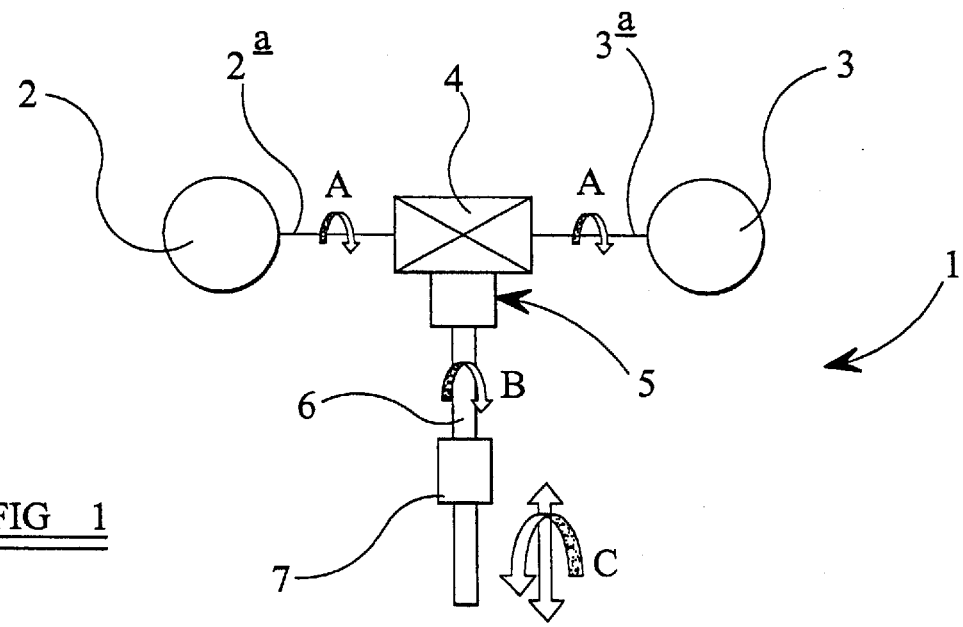

The invention relates to a monitoring apparatus for monitoring operation of a no-back device of an actuator assembly driven by a motor.

No-back devices are known for use with motor-driven actuators for preventing external forces driving the actuator in a direction contrary to a selected direction of actuation. Such no-back devices may also counter effects of external assisting forces on the actuator, that is, forces tending to act on the actuator in the selected direction. No-back devices are particularly useful for use in safety-critical applications, for example with actuators for controlling aircraft flight control surfaces, but are not limited to such applications. The correct functioning of such no-back devices is particularly critical in the event of a mechanical, electrical or hydraulic failure in an actuator's forward drive system, which could otherwise allow the actuator to be driven by external forces.

An example of a known linear no-back device of the screw and nut type is described in GB-A-1 309 645, although the invention also has applications for use with rotary no-back devices.

One problem encountered using known actuator assemblies, for example aircraft flight control surface actuator assemblies, is that hitherto, whilst safety checks have been routinely made for faults in the no-back devices for example excessive backlash and for wear, which could indicate a potential risk of failure of the no-back device, no means has been provided for checking the condition of a no-back device during operation of the device in an actuator assembly.

In accordance with the invention, there is provided a monitoring apparatus for monitoring operation of a no-back device of an actuator assembly driven by a motor, the apparatus comprising sensor means operable to sense an operating parameter of tie motor for determining when the motor's output drive is in a direction opposite to a selected direction of motor output drive.

If the output drive of the motor is acting in a direction opposite to the selected direction, this implies the no-back device is in failure mode. The invention facilitates the provision under operating conditions of an immediate indication of a fault arising in a no-back device of an actuator assembly. Such active condition monitoring is particularly advantageous in safety critical actuator assemblies, for example those used to control aircraft flight control surfaces.

The sensor means may be operable to sense a direction of a current which passes through the motor. This sensor means is for use with an electric motor.

Alternatively, the sensor means may be operable to sense a direction of flow of a fluid which passes through the motor. This sensor means is for use with a fluid-powered motor, for example an hydraulic motor.

Preferably, the monitoring apparatus comprises determination means operable to determine when the motor's output drive is in a direction opposite to the selected direction of motor output drive using information about the operating parameter sensed by the sensor means.

The detonation means may comprise a data processor and may further comprise a comparator connected to the data processor.

The monitoring apparatus may comprise indication means operable to provide an indication, for example a visual and/or audible warning signal, when the determination means has determined that the motor's output drive is in a direction opposite to the selected direction of motor output drive, for alerting an operator of all actuator assembly that a no-back device of the actuator assembly is in failure mode.

According to a further aspect of the invention, there is provided an aircraft flight-control means comprising a flight control surface and an actuator assembly for controlling an attitude of the surface relative to a body portion of the aircraft, the actuator assembly being driven by a motor and including a no-back device, the flight control mean further comprising a monitoring apparatus as described above for monitoring operation of the no-back device.

In accordance with a further aspect of the invention, there is provided a method of monitoring operation of a no-back device of an actuator assembly driven by a motor, the method comprising sensing an operating parameter of the motor for determining when the motor's output drive is in a direction opposite to a selected direction of motor output drive.

The method may comprise sensing a direction of a current which passes through the motor.

Alternatively, the method may comprise sensing a direction of flow of fluid which passes through the motor.

The method may comprise providing an indication, for example a visual and/or audible warning signal, when the motor's output drive is in a direction opposite to the selected direction of motor output drive, for alerting an operator of an actuator assembly that a no-back device of the actuator assembly is in failure mode.

Figure 2:
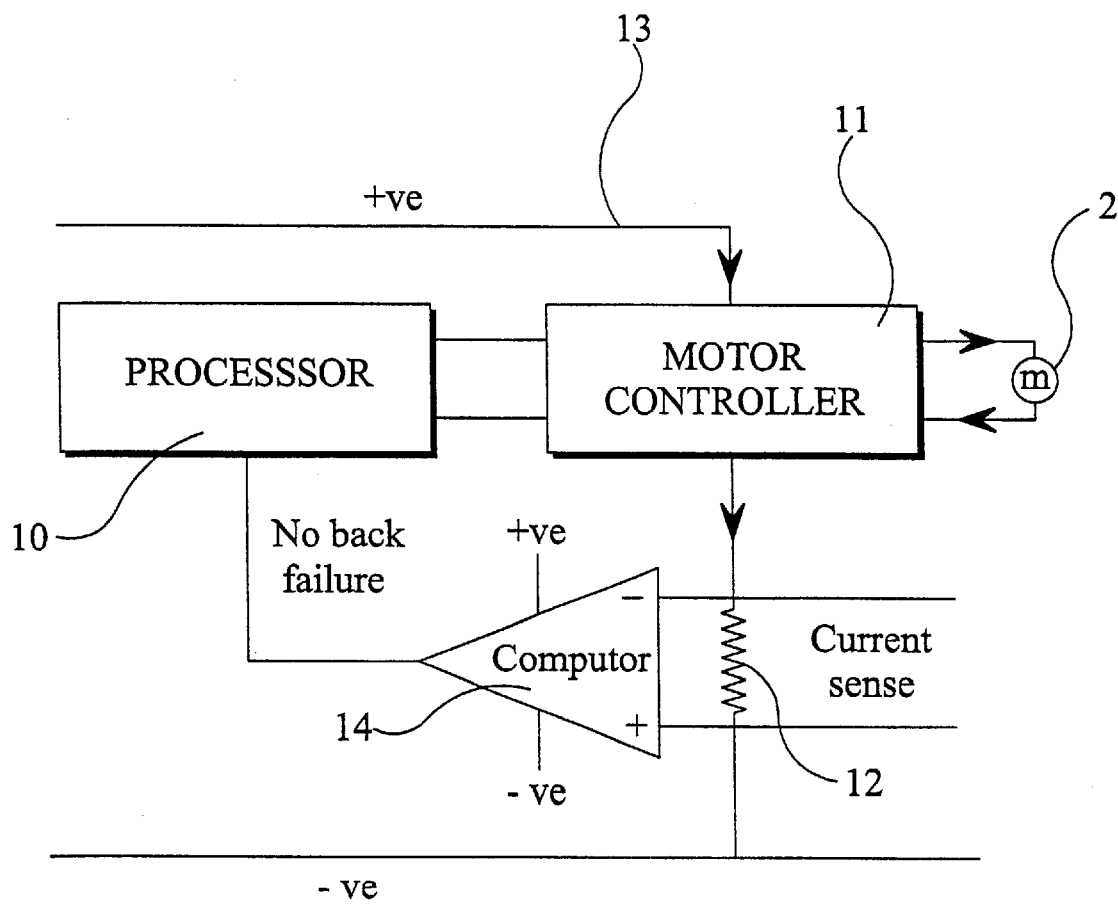
Figure 3:
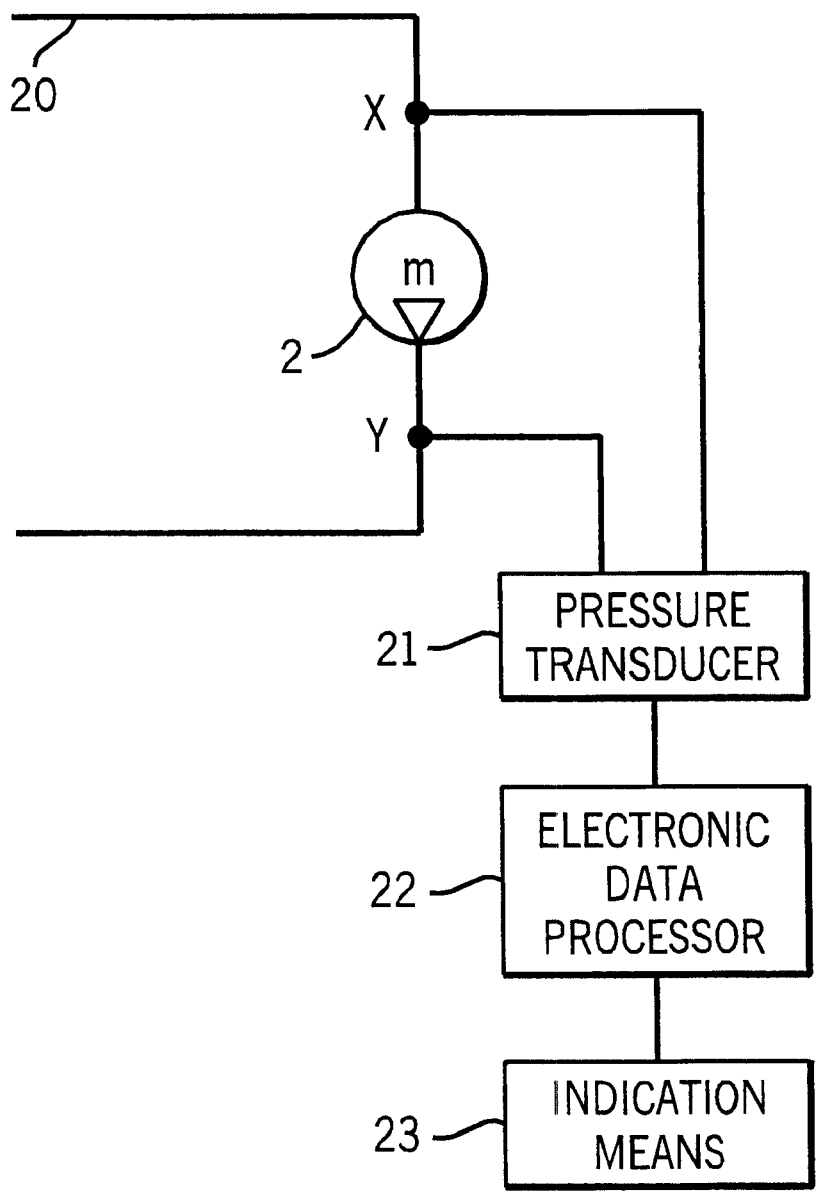

In order that the invention maybe better understood, two embodiments thereof will now be described, by way of example only, with reference to the accompanying drawings, in which:

FIG. 1 is a schematic drawing showing a dual motor actuator assembly including a no-back device;

FIG. 2 is a schematic drawing showing a control arrangement for controlling an electric motor of the assembly of FIG. 1, including sensor means operable to sense an operating parameter of the motor; and FIG. 3 a schematic diagram of an alternative embodiment of the assembly shown in FIG. 1, and shows an hydraulic motor of the actuator assembly and sensor means operable to sense an operating parameter of the hydraulic motor.

FIG. 1 shows an actuator assembly, shown generally as 1, comprising two motors 2, 3, a gearbox 4 a no-back device 5 an output shaft 6 from the gearbox 4 passing through the no-back device 5, and an output mechanism 7. The output mechanism 7 can be connected, for example, to a flight control surface (not shown) such as a high-lift (flap and slat) or horizontal stabilizer of an aircraft. Such assemblies are known in the art, and it will be apparent to a skilled reader that any suitable type of gearbox, for example direct or differential, could be employed and any suitable type of motor, for example electric or hydraulic, could be employed. Whilst two motors are shown to provide for redundancy, it will also be apparent that a single motor or more than two motors could be used.

A particular drive direction has been selected by an operator of the assembly 1 shown in FIG. 1, so as to drive respective shafts 2a, 3a between the motors 2, 3 and the gearbox 4 in the direction shown by arrows A, resulting in rotation of the output shaft 6 in a direction shown by arrow B. The no-back 5 functions to prevent or reduce the effects of rotary or linear external forces represented by arrow C, in particular forces caused by air loads applied to the flight control surface, which would tend to oppose or assist motor drive in the selected direction. Still more crucially, the no-back device 5 functions to prevent external forces driving the flight control surface in the event of failure in a part of the actuator assembly. Any suitable type of linear or rotary no-back device 5, may be employed in the actuator assembly 1.

In accordance with a first embodiment, FIG. 2 shows a control arrangement for controlling an electric-motor 2 of the actuator assembly 1. An electronic data processor 10 receives instructions (not shown) from an operator of the actuator assembly 1 for controlling a motor controller 11. The motor controller drives the electric motor 2, and may be used to drive other electric motors, for example motor 3, as required. Sensor means, in the form of a current sensor 12, is provided in series in the motor controller's current drive circuit 13. A comparator 14 has inputs connected to the current sensor 12 and an output connected to the processor 10, The information from the comparator output enables the processor 10 to determine when the motor's output drive is in a direction opposite to a direction selected by the processor 10. Thus, if the no-back devices fails and rotary or linear external loading C drives the actuator in a direction opposite to the selected direction, the comparator detects a reversal of drive current and the processor 10, having determined that the no-back device 5 must be in failure mode due to reversal of the motor drive current, outputs a signal to indication means (not shown). The indication means maybe a device, actuatable by an appropriate signal from processor 10, for providing a visual and/or audible warning signal for alerting an operator of the actuator assembly 1 that the no-back device 5 is in failure mode.

Of course, means of using motor operating parameters other than drive current for detecting a reversal of motor drive will be apparent to the skilled reader. For example, motor generated voltage, or differential pressure for hydraulic systems, may be used.

FIG. 3 relates to an alternative embodiment which employs an hydraulic motor 2 for driving the actuator assembly 1. The hydraulic motor 2 is supplied with fluid through a drive circuit 20 and controlled by control means (not shown) which may include an electronic data processor. During operation of the motor 2, pressure at two points X and Y in the drive circuit 20 on opposite sides of the motor 2 is sensed by sensing means in the form of at least one pressure transducer 21. Information regarding the operating pressure at X and Y is thus converted to electronic form and is passed to determination means in the form of an electronic data processor 22 for determining whether the pressure differential between points X and Y is consistent with the selected direction of motor drive. If the pressure differential indicates that the motor 2 is being driven in a direction which has not been selected, the processor 22 causes a signal to be sent to indication means 23 for causing the indication means 23 to provide a visual and/or audible signal for alerting an operator of the actuator assembly 1 that the no-back device 5 is in failure mode.

It is envisaged that the pressure information could be used directly to provide a warning indication, without first converting the pressure information to an electrical signal. Also, use of the invention with other types of motor, for example gas powered motors, may be envisaged.

As should be apparent from the above, active condition monitoring of the no-back device 5 is provided, so that failure of the device 5 during operation can be detected and the failure information communicated to an operator in real time.

What is claimed is:

1. A monitoring apparatus for monitoring operation of a no-back device of an actuator assembly driven by a motor, the apparatus comprising sensor means operable to sense an operating parameter of the motor for determining when the motor's output drive is in a direction opposite to a selected direction of motor output drive.

2. A monitoring apparatus as claimed in claim 1, wherein the sensor means is operable to sense a direction of a current which passes through the motor.

3. A monitoring apparatus as claimed in claim 1, wherein the sensor means is operable to sense a direction of flow of fluid which passes through the motor.

4. A monitoring apparatus as claimed in claim 1, comprising determination means operable to determine when the motor's output drive is in a direction opposite to the selected direction of motor output drive using information about the operating parameter sensed by the sensor means.

5. A monitoring apparatus as claimed in claim 4, wherein the determination means comprises a data processor.

6. A monitoring apparatus as claimed in claim 4, wherein the determination means comprises a comparator.

7. A monitoring apparatus as claimed in claim 1, comprising indication means operable to provide an indication when the determination means has determined that the motor's output drive is in a direction opposite to the selected direction of motor output drive, for alerting an operator of an actuator assembly that a no-back device of the actuator assembly is in failure mode.

8. A monitoring apparatus as claimed in, claim 7, wherein the indication is a visual and/or audible warning signal.

9. Aircraft flight-control means comprising a flight control surface and an actuator assembly for controlling an attitude of the surface relative to a body portion of the aircraft the actuator assembly being driven by a motor and including a no-back device, the flight control means further comprising a monitoring apparatus as claimed claim 1 for monitoring operation of the no-back device.

10. A method of monitoring operation of a no-back device of an actuator assembly driven by a motor, the method comprising sensing an operating parameter of the motor for determining when the motor's output drive is in a direction opposite to a selected direction of motor output drive.

11. A method as claimed in claim 10, comprising sensing a direction of a current which passes through the motor.

12. A method as claimed in claim 10, comprising sensing a direction of flow of fluid which passes through the motor.

13. A method as claimed in claim 10, comprising providing an indication when the motor's output drive is in a direction opposite to the selected direction of motor output drive, for alerting an operator of an actuator assembly that a no-back device of the actuator assembly is in failure mode.

* * * * *